R. D. MERSHON.
CURRENT RECTIFYING APPARATUS.
APPLICATION FILED DEC. 16, 1913. RENEWED MAR. 30, 1918.

1,265,354.

Patented May 7, 1918.

Witnesses:
W. P. Johnson
A. L. Dunham

R. D. Mershon, Inventor
By his Attorneys
Kerr, Page, Cooper & Hayward

UNITED STATES PATENT OFFICE.

RALPH D. MERSHON, OF NEW YORK, N. Y.

CURRENT-RECTIFYING APPARATUS.

1,265,354. Specification of Letters Patent. Patented May 7, 1918.

Application filed December 16, 1913, Serial No. 806,994. Renewed March 30, 1918. Serial No. 225,833.

*To all whom it may concern:*

Be it known that I, RALPH D. MERSHON, a citizen of the United States, residing at New York, in the county and State of New York, have invented certain new and useful Improvements in Current-Rectifying Apparatus, of which the following is a full, clear, and exact description.

The electrolytic rectifier depends for its operation on the dielectric film which may be formed upon the surface of aluminum and certain other metals when immersed in a suitable electrolyte, such as a solution of borax in water, and subjected to the electrolytic effect of a suitable current. This film possesses the remarkable property of permitting current to flow from the electrolyte to the electrode with little resistance, but of strongly opposing the flow of current from the electrode to the electrolyte. This flow of current from the electrolyte to the electrode is accompanied by a breaking down of the dielectric film; but when the voltage is reversed, the accompanying flow of current builds up the film again. This building up is not, however, complete, and moreover is effected at the expense of the underlying metal, which means that the rapid reversal of the current when the device is in use, with the consequent breaking down and building up of the film, causes not only loss in the device, but also corrosion of the electrodes and exhaustion of the electrolyte.

Among mechanical rectifiers there is one employing a vibrating reed or lever arranged and actuated to make and break the circuit at the instants when the current in the circuit has a low value, preferably zero. Such a rectifier operates very satisfactorily so long as the phase of the vibration of the reed or lever, with respect to the current in the circuit which it opens and closes, is such as will cause the break in the circuit to occur at or approximately at the zero value of the current. If, however, anything occurs to change the phase relation of the zero value of the current with respect to the vibration of the lever the break at the lever contacts is likely to occur when the current broken has an appreciable value, resulting in an arc across the contacts which may cause serious injury or even destruction to the apparatus.

I have, therefore, been led to devise my present invention, which has for its chief object to provide a mechanical or semi-mechanical rectifier which shall have at all times a continuous path for the current, even when the normal circuit thereof is being opened or closed, so that there will be no injurious or destructive arcing between the contacts even though a high potential wave or surge may be passing over the line at the instant, and so that the vibrating reed or lever may be actuated by the current, thereby keeping the vibration of the reed or lever always in phase with the current whose circuit it opens and closes, even though the phase of the current itself may vary. To this and other ends the invention consists in the novel features of construction and combinations of elements hereinafter described.

Convenient and effective embodiments of the invention are illustrated diagrammatically in the accompanying drawing, in which—

Figure 1:
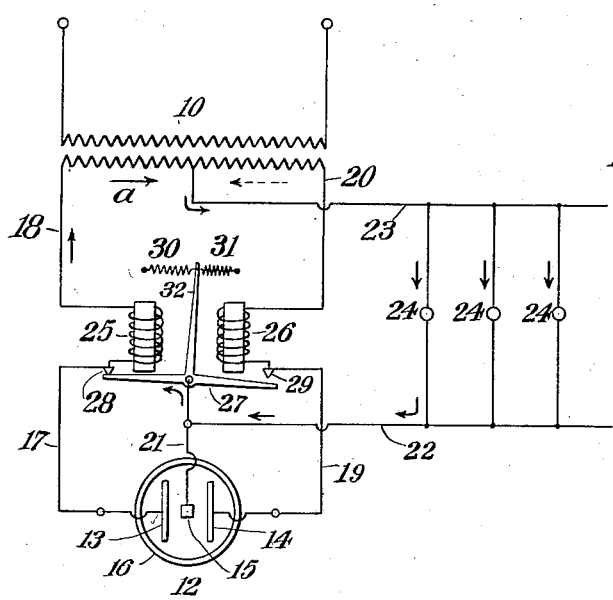
Figure 1 shows the preferred form.
Figure 2:
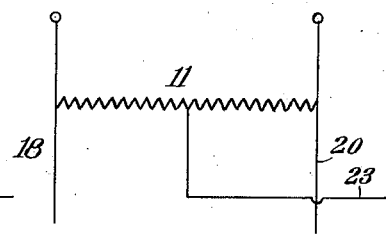
Fig. 2 is a detail view of a modification.

In Fig. 1, 10 represents a transformer, which may be of the type having separate primary and secondary windings, as shown, or an "auto-transformer" as illustrated at 11 in Fig. 2. In either case the transformer is connected by the terminals with a source of alternating current, not shown.

In the secondary circuit is a device which may be conveniently termed a subordinate rectifier in that under normal working conditions it carries current for only a small part of the time of each cycle. Broadly considered, this device is in the nature of an asymmetrical resistance or current-passing device; that is, a device which permits a great deal more current to flow out of it in one direction than in the other, as, for example, the well known crystals which have such asymmetrical properties, or, preferably, a small electrolytic rectifier, shown in plan at 12 and comprising a pair of filming electrodes 13, 14, and a non-filming electrode 15, immersed in a suitable electrolyte contained in a vessel 16. The outlet terminals (to which the electrodes 13, 14 are connected) are connected to the terminals of the transformer secondary through wires 17, 18, 19, 20, while the inlet terminal (to which electrode 15 is connected) is connected by wires 21, 22, 23, through one or more translating devices 24, to the middle point of the transformer.

Inasmuch as in the device 12 current can, under normal conditions, readily flow from electrode 15 to either electrode 13 or 14, but can flow in only very slight amount from the latter electrodes to the former, it will be seen that whatever may be the direction of the current in the transformer, the current in the path through the translating devices will always be unidirectional, and in the direction of the arrows applied to wires 23, 22. Hence, so far as described, the arrangement illustrated is a simple electrolytic rectifier and would operate as such.

In series with the electrodes 13, 14, are two electro-magnets 25, 26, and adjacent thereto is a light reed or lever 27 having its two contact arms, in the present instance, composed of magnetic material in the fields of the magnets, as shown. The lever (which in the arrangement illustrated is in effect a pole-changing switch composed of two arms joined together) is connected to the wire 21, and above the arms of the lever are two contacts 28, 29, connected to the wires 17 and 19 respectively. Opposing springs 30, 31, connected with the lever through the medium of a light arm 32, tend to hold the lever in a neutral position with the contact-arms separated from the coöperating contacts 28, 29.

The contact-arms of the lever 27 being in the neutral position and the current in the transformer at zero value, suppose a current starts in the direction of the arrow $a$. Since the current cannot flow through either contact 28, 29, and also cannot flow from electrode 14 to electrode 15, but can pass from electrode 15 to 13, it will take the direct current path by way of wire 23, devices 24, wires 22, 21, electrodes 15, 13, wire 17, magnet 25 and wire 18 back to the transformer. This current through the branch 17—18 energizes the magnet 25, which, when the energizing current has a value sufficiently greater than zero, swings the lever 27 clockwise into engagement with contact 28, thereby laying a shunt across electrodes 15, 13. The relatively low resistance of the path through the contact 28 now causes the current to forsake the device 12, almost, if not entirely; so that the current now flows from wire 22 to contact lever 27, contact 28, magnet 25 and wire 18 back to the transformer. When the current passes its maximum value and falls to zero, or to a value approximating zero and too low to hold lever 27 in engagement with contact 28 against the tension of spring 30, the lever resumes its neutral or initial position and the current then can flow only through the subordinate rectifier 12 from electrode 15 to electrode 13.

The next current impulse is in the direction of the dotted arrow. This impulse, finding no path through contacts 28, 29, flows by way of the direct-current path through the translating devices 24 in the direction of the adjacent arrows and through the auxiliary rectifier 12 from electrode 15 to electrode 14. The magnet 26 is now energized, swinging the lever 27 counterclockwise and establishing the circuit through lever 27, contact 29, magnet 26 and wire 20 back to the transformer.

From the foregoing it will be seen that there is always a path for the current through the auxiliary rectifier 12, but that as soon as the current, in either direction, rises to a value sufficient to give one or the other of magnets 25, 26 a field strong enough to actuate the periodically operating lever 27, a path of lower resistance than that through the device 12 will be established. Hence the difference of potential between electrode 15 and either of the electrodes 13, 14, is never high (under normal conditions), and at no time does much current flow through the device 12. The result is that the injurious effect of alternating current on the filmed electrodes is greatly reduced if not practically eliminated, so that the electrodes have long life and the loss and heating in the rectifier 12 are rendered much less than they would be if the vibrating mechanism were not employed. On the other hand, the movements of the contact-lever 27 never leave the current without a path, since the circuit through the auxiliary rectifier 12 is always closed. The result is that any arc that may be produced between the lever and the contacts will be much smaller than would otherwise be the case, and will usually be too small to cause material damage to the apparatus. Under abnormal conditions the auxiliary device 12 may suffer injury; but even if the injury is serious, the device can be repaired or replaced at comparatively small expense, while the vibrator and its contacts are always protected.

Figure 3:
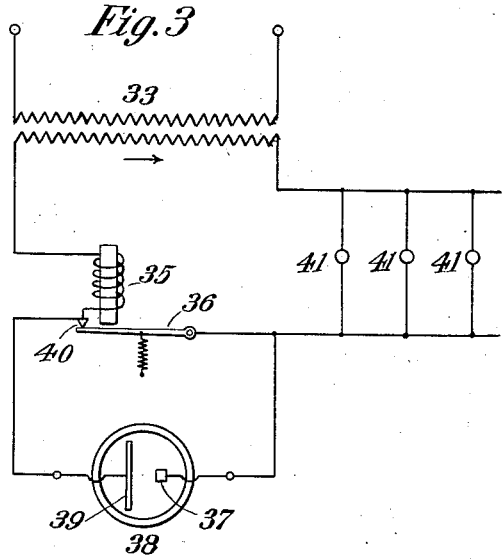
Figs. 3 and 4 show other forms of the invention.

In the form shown in Fig. 3, (employing a transformer 33 or connected directly to the line if the voltage of the latter is suitable), only one magnet, 35, is used, with a reed or lever 36 actuated thereby and connected to the non-filming electrode 37 of the auxiliary or subordinate rectifier 38. The latter has a filming electrode 39 connected to one terminal of the transformer secondary by way of a contact 40 and the magnet 35. The other terminal of the transformer secondary is connected to electrode 37 through one or more translating devices 41. It is clear that under normal conditions current in the direction of the arrow can readily flow through the translating devices, but that only slight current can flow in the opposite direction; for after the decrease of the current has caused its path through the reed 36 to be broken at the contact 40, the succeeding and opposite current impulse cannot flow from contact 40 to the reed 36, and at the same time encounters high resistance between electrode 39 and electrode 37.

Figure 4:
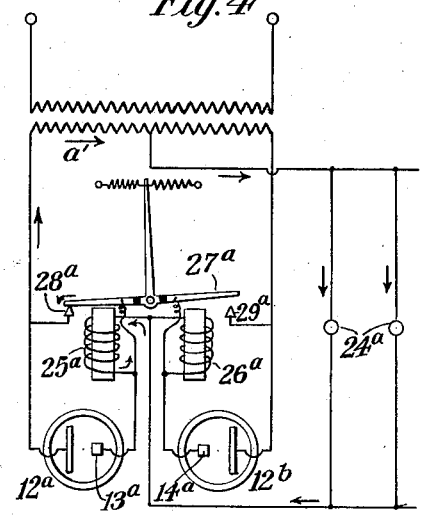

The arrangement shown in Fig. 4 is similar to that shown in Fig. 1, but the auxiliary or subordinate rectifier is divided into two parts, 12$^a$, 12$^b$, as is also the lever 27$^a$; while the magnets 25$^a$, 26$^a$, are connected to the inlet electrodes 13$^a$, 14$^a$, and to the lever 27$^a$. When the current in the transformer is in the direction of the arrow $a'$ it flows through the translating devices 24$^a$, magnet 25$^a$, and the auxiliary rectifier 12$^a$. The magnet 25$^a$, being thus energized, rocks the lever 27$^a$ counter-clockwise and brings it into engagement with the contact 28$^a$. The current now flows through the magnet 25$^a$, left-hand portion of lever 27$^a$, and contact 28$^a$, with little or no current through the auxiliary rectifier 12$^a$. When the current in the transformer is in the opposite direction it flows through the other branch of the circuit, energizing magnet 26$^a$ and bringing the lever into engagement with contact 29$^a$, as will readily be understood. The arrangement illustrated in Fig. 4 has the advantage that there is practically no difference of potential between the two magnets, so that less care is needed in insulating them from each other than is the case in Fig. 1.

The form shown in Fig. 3 is simpler, but I prefer those of Figs. 1 and 4, because these latter forms make use of current in both directions.

It will be observed that in the embodiment illustrated in Fig. 1 the conductor 22 is in effect branched at the juncture thereof with the wire 21. In the first half-cycle the current flows through the left-hand branch, for example, and in the second half-cycle the current-path is through the right hand branch. Hence the two branches can be conveniently described as being "in parallel", (although in the arrangement shown they do not carry current simultaneously), particularly since both branches begin at the same point and end at the same point. Similar considerations apply to the embodiment illustrated in Fig. 4.

It is to be understood that the invention is not limited to the embodiments herein specifically illustrated and described, but can be embodied in other forms without departure from its proper spirit and scope.

What I claim is:

1. In a rectifying apparatus, the combination of a circuit for unidirectional current-impulses, means to open and close the circuit periodically, an asymmetrical current-passing device in parallel with said means, and means for connecting the circuit with a source of alternating current, the means for opening and closing said circuit periodically being responsive in operation to the current impulses through the asymmetrical current-passing device.

2. In a rectifying apparatus, the combination of a circuit for unidirectional current-impulses, electromagnetically operated means in said circuit to open and close the circuit periodically, an electrolytic device connected in parallel with said means and permitting outflow of current in one direction only, and means for connecting the circuit with a source of alternating current, said electromagnetically operated means being responsive to current impulses flowing through the electrolytic device.

3. In a rectifying apparatus, the combination of a circuit for unidirectional current-impulses; an electromagnet energizable by current in said circuit; an asymmetrical current-passing device in series with the magnet; a vibratory armature connected to the circuit between the magnet and the asymmetrical device on one side of the latter; a contact in the circuit between the magnet and the asymmetrical device on the other side of the latter, and located in the path of the armature for coöperation therewith; and means for connecting the circuit with a source of alternating current.

4. In a rectifying apparatus, the combination of a circuit comprising a path for unidirectional current and branches in parallel with each other across said path; means for periodically opening and closing one branch and closing and opening the other; an asymmetrical current-passing device connected across the points of make and break of the said means and to the unidirectional path, said means being responsive to current impulses through said path and asymmetrical current-passing device, and permitting current to pass through the unidirectional path in one direction only; and means for connecting the circuit with a source of alternating current.

5. In a rectifying apparatus, the combination of a circuit comprising a path for unidirectional current having branches in parallel with each other; periodically operating means to open one branch and close the other; an electrolytic rectifier connected to the unidirectional path and across the points of make and break of the said periodically operating means; and means for connecting the circuit with a source of alternating current, the periodically operating means being responsive to current impulses through the electrolytic rectifier.

6. In a rectifying apparatus, the combination of a circuit comprising a path of unidirectional current and branches in parallel; periodically operating means to open one branch and close the other; an asymmetrical current-passing device having a pair of inlet terminals connected across the periodically operating means and an inlet terminal connected to the unidirectional path; and means for connecting the circuit with a source of alternating current, the periodically operating means being responsive to current impulses through the asymmetrical current-passing device.

7. In a rectifying apparatus, the combination of a path for unidirectional current; an asymmetrical current passing device having a pair of outlet terminals and having an inlet terminal in series with said path; parallel branches connected at one end to said path and at the other to the outlet terminals of said asymmetrical device; contacts connected to said branches; a pole-changing switch coöperating with said contacts and connected with the outlet terminal of the asymmetrical device; means responsive to current impulses through the asymmetrical device for actuating the switch periodically; and means for connecting said path and branches with a source of alternating current.

8. In a rectifying apparatus, the combination of a path for unidirectional current, an electrolytic rectifier connected with said path, periodically operating means responsive to current impulses through the electrolytic rectifier for laying a shunt across the same, and means for connecting said path with a source of alternating current.

9. In a rectifying apparatus, the combination of an electrolytic rectifier having outlet terminals and an inlet terminal; a transformer connected to the said outlet terminals; a path for unidirectional current connected at one end to an intermediate point of the transformer and at the other end to said inlet terminal; automatic means responsive to current impulses through the electrolytic rectifier for connecting the last named end of said path directly to the transformer terminals in alternation; and means for connecting the transformer with a source of alternating current.

10. In a rectifying apparatus, the combination of a transformer; an electrolytic rectifier having outlet terminals in circuit with the transformer, and having an inlet terminal; a path for unidirectional current connected at one end to an intermediate point of the transformer and at the other end to the inlet terminal of the electrolytic rectifier; electromagnets in circuit with the transformer on opposite sides of the electrolytic rectifier; contacts between the electromagnets and the electrolytic rectifier; a contact lever actuated by the electromagnets to coöperate with the contacts alternately, said lever being connected with the outlet terminal of the electrolytic rectifier; and means for connecting the transformer with a source of alternating current.

11. In a rectifying apparatus, the combination of an electrolytic rectifier having an inlet terminal and an outlet terminal; a transformer in circuit with said terminals; electromagnetic mechanism, in circuit with the transformer and electrolytic rectifier and responsive to current impulses therethrough, and operating periodically to lay a shunt across the said terminals of the electrolytic rectifier; and means for connecting the transformer with a source of alternating current.

12. In a rectifying apparatus, the combination of a path for unidirectional current; an electrolytic rectifier connected with said path; an alternating-current circuit connected with said path, through the electrolytic rectifier; periodically operating means, actuated by current in said alternating-current circuit, for laying a shunt across the electrolytic rectifier; and means for connecting said circuit with a source of alternating current.

13. The combination of a circuit carrying an alternating current, a load circuit, mechanical switching means for delivering impulses of said alternating current to the load circuit as direct current during a part of the half cycle intervals, an asymmetric rectifying device connected to opposite poles of said switching means for delivering the remainder of the half cycle intervals when said switching means is open-circuited, and electromagnetic means energized by current impulses through the asymmetric rectifying device to actuate said mechanical switching means.

In testimony whereof I affix my signature in the presence of two subscribing witnesses.

RALPH D. MERSHON.

Witnesses:
M. LAWSON DYER,
S. S. DUNHAM.